US012084983B2

United States Patent
Vacca et al.

(10) Patent No.: US 12,084,983 B2
(45) Date of Patent: Sep. 10, 2024

(54) CENTERING DEVICE FOR CENTERING A TURBINE HOUSING, TURBO SYSTEM INCLUDING THE CENTERING DEVICE, AND METHOD OF CENTERING A TURBINE HOUSING

(71) Applicant: TURBO SYSTEMS SWITZERLAND LTD., Baden (CH)

(72) Inventors: Andrea Vacca, Brittnau (CH); Matthias Richner, Gebenstorf (CH); Antje Hertel, Ehrendingen (CH)

(73) Assignee: TURBO SYSTEMS SWITZERLAND LTD., Baden (CH)

( * ) Notice: Subject to any disclaimer, the term of this patent is extended or adjusted under 35 U.S.C. 154(b) by 0 days.

(21) Appl. No.: 17/782,888

(22) PCT Filed: Dec. 2, 2020

(86) PCT No.: PCT/EP2020/084313
§ 371 (c)(1),
(2) Date: Jun. 6, 2022

(87) PCT Pub. No.: WO2021/110765
PCT Pub. Date: Jun. 10, 2021

(65) Prior Publication Data
US 2023/0003142 A1    Jan. 5, 2023

(30) Foreign Application Priority Data

Dec. 6, 2019  (EP) ..................................... 19214158

(51) Int. Cl.
*F01D 25/28*  (2006.01)
*F01D 9/04*  (2006.01)
*F01D 25/24*  (2006.01)

(52) U.S. Cl.
CPC ............. *F01D 25/28* (2013.01); *F01D 9/045* (2013.01); *F01D 25/24* (2013.01);
(Continued)

(58) Field of Classification Search
CPC .......... F01D 25/24; F01D 25/28; F01D 9/045; F05D 2230/64
See application file for complete search history.

(56) References Cited

U.S. PATENT DOCUMENTS

| | | | |
|---|---|---|---|
| 2005/0053463 A1* | 3/2005 | Kopp ...................... | F01D 9/026 415/214.1 |
| 2011/0142604 A1* | 6/2011 | Schumnig ............... | F01D 25/24 415/170.1 |

(Continued)

FOREIGN PATENT DOCUMENTS

| | | |
|---|---|---|
| EP | 1460237 A1 | 9/2004 |
| EP | 2098703 A1 | 9/2009 |
| WO | 2014168803 A1 | 10/2014 |

OTHER PUBLICATIONS

International Search Report and Written Opinion filed in International Application No. PCT/EP2020/084313, mailed Feb. 1, 2021, 12 pages.

(Continued)

*Primary Examiner* — J. Todd Newton
*Assistant Examiner* — Cameron A Corday
(74) *Attorney, Agent, or Firm* — Meunier Carlin & Curfman LLC (57) ABSTRACT

A centering device (10) for centering a turbine housing (40) with respect to a central axis (33) of a radial turbine of a turbo system is described. The centering device (10) includes a ring-shaped body (11) having an outer diameter D1 and an inner diameter D2, wherein a ratio of D1/D2 is ≤2. Additionally, the centering device (10) includes two or more centering elements (16) provided on a side surface (12)

(Continued)

of the ring-shaped body (11) for engaging with respective complementary centering elements (21) provided on a bearing housing (20). The two or more centering elements (16) are configured for allowing a radial thermal expansion of the ring-shaped body (11) during engagement of the two or more centering elements (16) with the respective complementary centering elements (21). Further, a turbo system, including such a centering device as well as a method of centering a turbine housing are described.

15 Claims, 4 Drawing Sheets

(52) U.S. Cl.
CPC ...... *F05D 2220/40* (2013.01); *F05D 2230/64* (2013.01); *F05D 2240/128* (2013.01); *F05D 2260/231* (2013.01); *F05D 2260/31* (2013.01)

(56) References Cited

U.S. PATENT DOCUMENTS

| | | | |
|---|---|---|---|
| 2016/0032768 A1* | 2/2016 | Schumnig | F01D 25/16 415/203 |
| 2018/0171825 A1* | 6/2018 | Hossbach | F01D 25/246 |

OTHER PUBLICATIONS

Extended European Search Report filed in European Application No. 19214158.8, mailed May 14, 2020, 6 pages.
Office Action in connection to JP Application No. JP 2022533443, dated Mar. 21, 2024.

* cited by examiner

CENTERING DEVICE FOR CENTERING A TURBINE HOUSING, TURBO SYSTEM INCLUDING THE CENTERING DEVICE, AND METHOD OF CENTERING A TURBINE HOUSING

CROSS REFERENCE TO RELATED APPLICATIONS

This application is a United States National Phase Patent Application of International Patent Application Number PCT/EP2020/084313, filed on Dec. 2, 2020, which claims the benefit of priority to EP Application No. 19214158.8, filed Dec. 6, 2019.

TECHNICAL FIELD

Embodiments of the present disclosure relate to a center device for centering a turbine housing. Further, embodiments of the present disclosure relate to a turbo system, e.g. a turbocharger or turbo compound, having a centering device as described in the present disclosure. Additionally, embodiments of the present disclosure relate to a method of centering a turbine housing, particularly by using a centering device as described herein.

BACKGROUND

Typical turbo systems are turbochargers or turbo compounds. Today, exhaust gas turbochargers are widely used to increase the performance of internal combustion engines. An exhaust gas turbocharger typically has a turbine in the exhaust tract of the internal combustion engine and a compressor upstream of the internal combustion engine. The exhaust gas of the internal combustion engine is expanded in the turbine. The work gained is transferred by a shaft to the compressor, which compresses the air supplied to the internal combustion engine. By using the energy of the exhaust gas to compress the air supplied to the combustion process in the internal combustion engine, the combustion process and the efficiency of the internal combustion engine can be optimized. A turbo-compound engine is a reciprocating engine that employs a turbine to recover energy from the exhaust gases. Instead of using that energy to drive a turbocharger, the energy is instead sent to the output shaft to increase the total power delivered by the engine.

Typically, a turbo system, e.g. a turbocharger or a turbo compound, include a turbine, particularly a radial turbine, encased in a turbine housing. The turbine housing has to be centered with respect to a central axis of the radial turbine. Typically, centering of the turbine housing is done by hot-gas centering, e.g. over a heat-shield or a nozzle ring provided between the turbine housing and the bearing housing. Conventional heat centering methods have the problem that equally fast heat transfer from exhaust gas to the heat centering element, e.g. a heat shield, cannot be assured, such that for transient operation conditions larger clearances between turbine wheel and turbine casing are required. However, larger clearances between turbine wheel and turbine casing have a detrimental effect on the turbine efficiency.

Accordingly, in view of the above, there is a demand for providing an improved centering of the turbine housing.

SUMMARY

In light of the above, a centering device for centering a turbine housing, a turbo system including a centering device as described herein, and a method of centering a turbine housing according to the independent claims are provided. Further aspects, advantages, and features are apparent from the dependent claims, the description, and the accompanying drawings.

According to an aspect of the present disclosure, a centering device for centering a turbine housing with respect to a central axis of a radial turbine of a turbo system is provided. The centering device, includes a ring-shaped body having an outer diameter D1 and an inner diameter D2, wherein a ratio of D1/D2 is smaller or equal to 2 (D1/D2≤2). Additionally, the centering device includes two or more centering elements provided on a side surface of the ring-shaped body. The two or more centering elements are configured for engaging with respective complementary centering elements provided on a bearing housing. The two or more centering elements are configured for allowing a radial thermal expansion of the ring-shaped body during engagement of the two or more centering elements with the respective complementary centering elements.

Accordingly, compared to the state of the art, the centering device of the present disclosure provides for an improved centering of a turbine housing with respect to a central axis of a radial turbine. In particular, embodiments of the centering device as described herein, provide for realizing a centering of a turbine housing at transient and stationary operation and for realizing minimal clearances between turbine wheel and turbine housing. Thus, compared to the state of the art, turbine efficiency can be increased by employing the centering device as described herein. In particular, it has been found that with a centering device as described herein, a clearance reduction and a turbine efficiency benefit can be achieved.

According to a further aspect of the present disclosure, a turbo system is provided. The turbo system includes a bearing housing, a turbine housing of a radial turbine, and a shaft extending along a central axis. The shaft is mounted in the bearing housing and a turbine wheel is arranged on the shaft. Further, the turbo system includes an exhaust gas inlet passage formed in the turbine housing upstream of the turbine wheel. Additionally, the turbo system includes a centering device according to embodiments described herein. The bearing housing includes centering elements complementary with the two or more centering elements of the centering device. The two or more centering elements of the centering device engage with the respective complementary centering elements of the bearing housing. The two or more centering elements are configured for allowing a radial thermal expansion of the ring-shaped body during engagement of the two or more centering elements with the respective complementary centering elements.

Accordingly, compared to the state of the art, an improved turbo system is provided. In particular, embodiments of the turbo system as described herein, provide for optimized centering of a turbine housing at transient and stationary operation in combination with minimized clearances between turbine wheel and turbine housing, such that the turbo system efficiency can be improved.

According to another aspect of the present disclosure, a method of centering a turbine housing with respect to a central axis of a radial turbine of a turbo system is provided. The method includes transmitting heat from exhaust gas to a centering device according to embodiments described herein. Further, the method includes centering the turbine housing via thermal expansion of the centering device.

Accordingly, compared to the state of the art, embodiments of the method as described herein provide for optimized centering of a turbine housing at transient and stationary operation in combination such that clearances between turbine wheel and turbine housing can be minimized and turbo system efficiency can be improved.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION OF EMBODIMENTS

Reference will now be made in detail to the various embodiments, one or more examples of which are illustrated in each figure. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to the same or to similar components. Generally, only the differences with respect to the individual embodiments are described. Unless specified otherwise, the description of a part or aspect in one embodiment can apply to a corresponding part or aspect in another embodiment as well.

Figure 1:
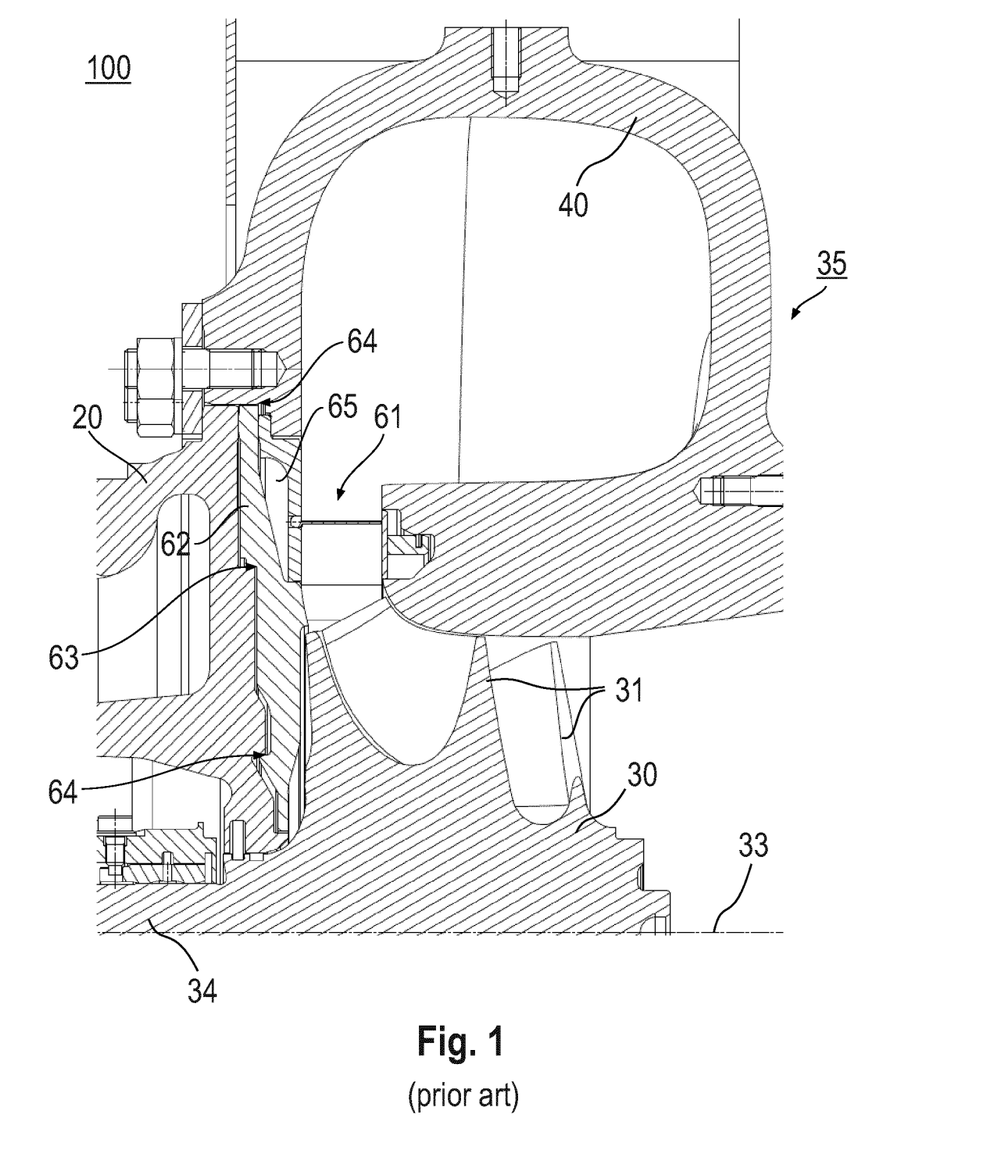
FIG. 1 shows a cross-sectional view of a part of a turbo system having a radial turbine and a heat shield for centering the turbine housing according to the prior art.

FIG. 1 shows a cross-sectional view of a turbo system 100 having a radial turbine 35 and a heat shield 62 for centering a turbine housing 40 according to the prior art. The radial turbine 35 includes a turbine housing 40, a shaft 34 which is mounted in a bearing housing 20 and on which a turbine wheel 30 with rotor blades 31 is provided. Additionally, FIG. 1 shows a heat shield 62 and a nozzle ring 61 arranged between the turbine housing 40 and the bearing housing 20. According to the prior art, as exemplarily shown in FIG. 1, hot-gas centering of the turbine housing is conducted via the heat shield. The shield shown in FIG. 1 has a cold centering element 63 and two hot centering elements 64. From FIG. 1 it is to be understood that at low temperatures the turbine housing 40 is centered via the cold centering element 63 whereas at high temperatures, i.e. upon thermal expansion of the heat shield 62, the turbine housing is centered via the hot centering elements 64. However, from FIG. 1 it is to be understood that at transient operating condition, i.e. during start-up of the turbine, the centering may not be optimal due to uneven thermal expansion throughout the heat shield. Further, as exemplarily shown in the prior art according to FIG. 1, conventionally there is a void 65 between the nozzle ring 61 and the heat shield 62, which may be detrimental for the heat transfer from exhaust gas to the heat shield for realizing the hot-centering.

Figure 2:
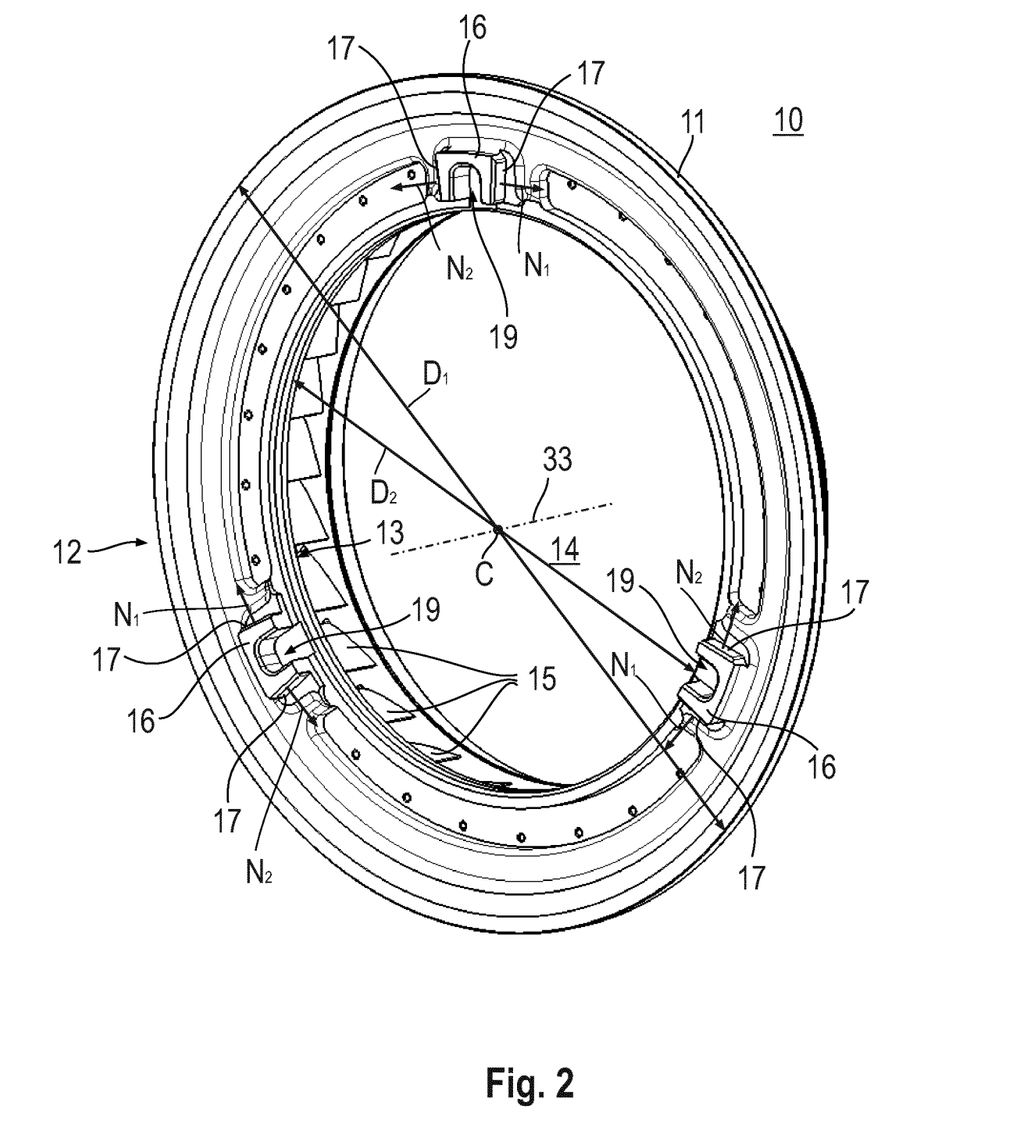
FIG. 2 shows a schematic isometric view of a centering device according to embodiments described herein.
Figure 3:
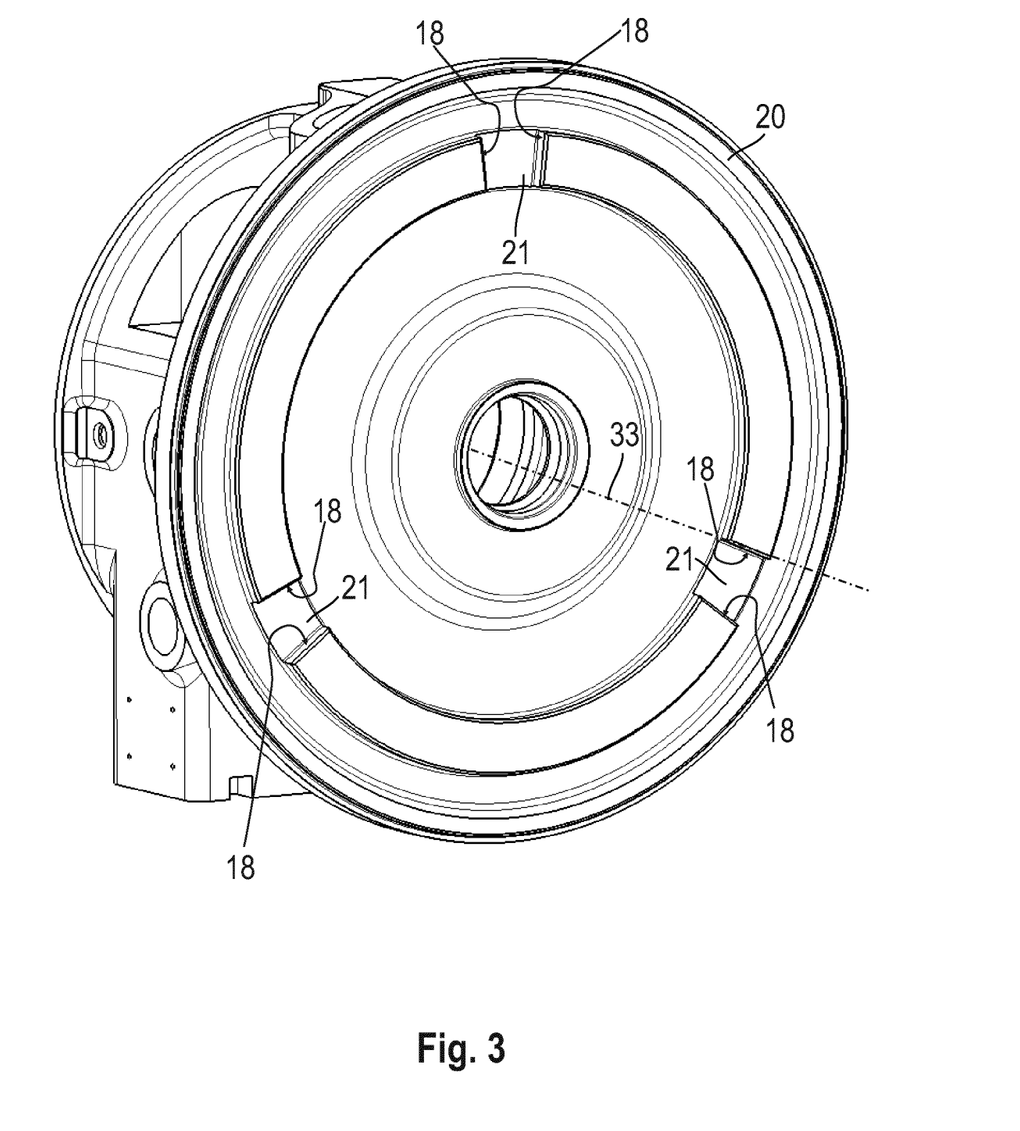
FIG. 3 shows a schematic isometric view of a bearing housing including complementary centering elements to the centering elements of the centering device according to embodiments described herein.
Figure 4:
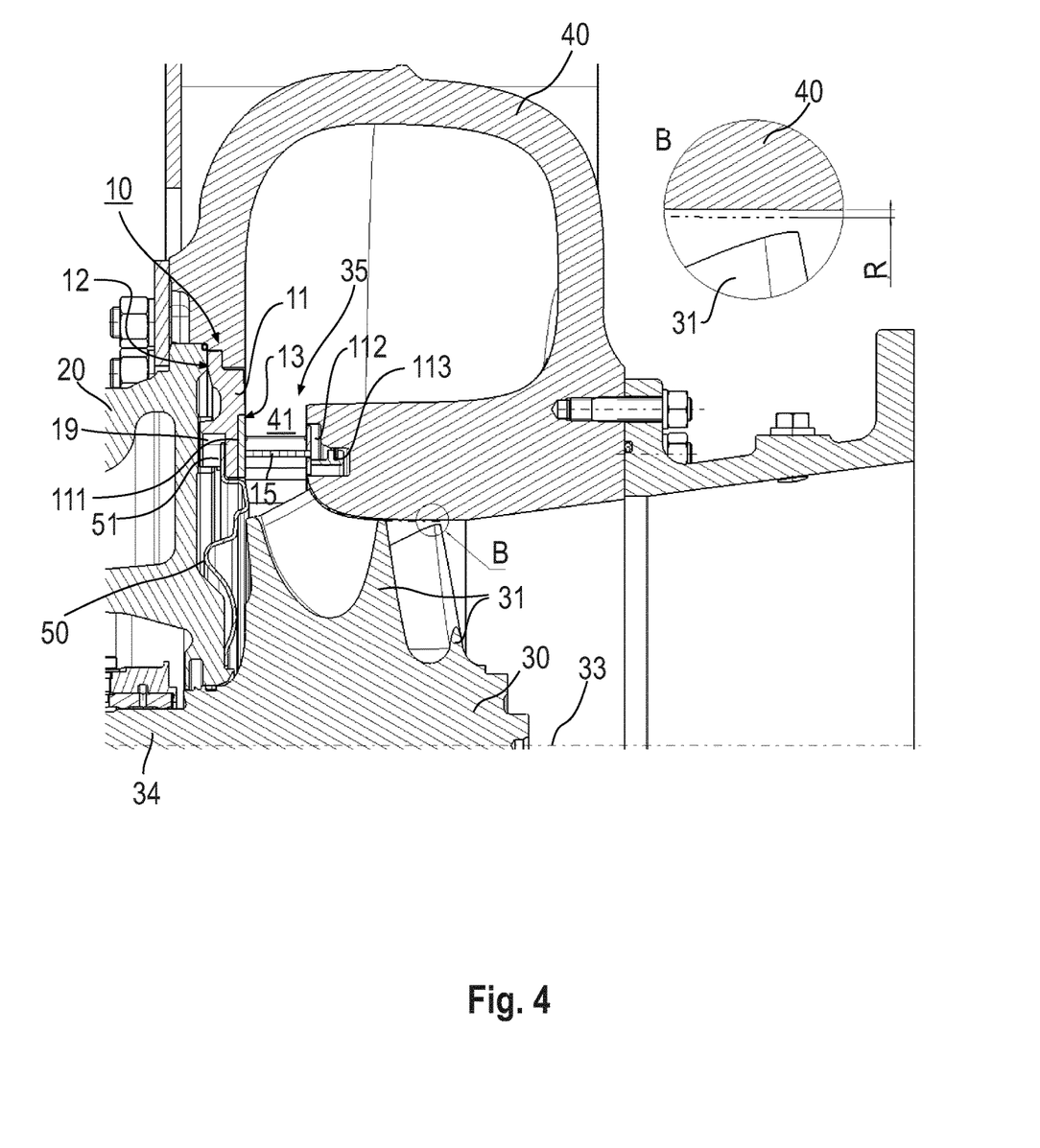
FIG. 4 shows a cross section of a part of a turbo system having a radial turbine including a centering device according to embodiments described herein.

With exemplary reference to FIGS. 2 to 4, a centering device 10 for centering a turbine housing 40 with respect to a central axis 33 of a radial turbine of a turbo system is described. According to embodiments, which can be combined with other embodiments described herein, the centering device 10 includes a ring-shaped body 11 having an outer diameter D1 and an inner diameter D2. The ratio of D1/D2 is smaller than or equal to 2 (D1/D2≤0.2). In particular, the inner diameter D2 of the ring-shaped body 11 typically provides a central opening 14. Typically, centering of the turbine housing at transient and hot operation conditions is realized via the outer radial shell surface, i.e. at the outer diameter D1, of the ring-shaped body.

It is to be understood that typically the centering device as described herein is a separate device. In other words, typically the centering device as described herein is not part of the bearing housing or of the turbine housing. More specifically, typically the cantering device according to embodiments described herein is neither an integral part of the bearing housing nor of the turbine housing, but an individual device.

Additionally, the centering device 10 includes two or more centering elements 16 provided on a side surface 12 of the ring-shaped body 11, as exemplarily shown in FIG. 2. Typically, the side surface 12 of the ring-shaped body 11 on which the two or more centering elements 16 are provided is a bearing housing side. The two or more centering elements 16 are configured for engaging with respective complementary centering elements 21 provided on a bearing housing 20, as exemplarily shown in FIG. 3.

Further, the two or more centering elements 16 are configured for allowing a radial thermal expansion of the ring-shaped body 11 during engagement of the two or more centering elements 16 with the respective complementary centering elements 21. In other words, the two or more centering elements 16 are configured such that during thermal expansion of the centering device 10 contact between the two or more centering elements 16 and the complementary centering elements 21 is ensured. More specifically, the two or more centering elements 16 are configured such that during radial thermal expansion of the ring-shaped body 11, a guided movement of the two or more centering elements 16 relative to the complementary centering elements 21 is provided.

Accordingly, by employing a centering device 10 in a turbo system, e.g. as exemplarily shown in FIG. 4, improved centering of a turbine housing, particularly at transient and stationary operation conditions can be provided. As a result thereof, a clearance R between turbine wheel blades 31 and turbine housing 40 can be reduced such that the turbine efficiency can be improved.

According to embodiments, which can be combined with other embodiments described herein, the two or more centering elements 16 have first planar guiding surfaces 17. The respective complementary centering elements 21 have complementary second planar guiding surfaces 18, as exemplarily shown in FIGS. 2 and 3. In particular, the first planar guiding surfaces 17 and the second planar guiding surfaces 18 are configured for guiding a relative movement of the two or more centering elements 16 with respect to the respective complementary centering elements 21 during thermal expansion, particularly radial thermal expansion, of the ring shaped body 11.

For instance, according to embodiments, which can be combined with other embodiments described herein, opposite surfaces of the first planar guiding surfaces 17 of the two or more centering elements 16 can be parallel to each other. Alternatively, the first planar guiding surfaces 17 of the two or more centering elements 16 may be inclined with respect to each other. In particular, the first planar guiding surfaces 17 may be inclined towards the center C of the inner diameter of the ring shaped body 11, as exemplarily shown in FIG. 2.

According to an example, which may be combined with other embodiments described herein, the first planar guiding surfaces 17 are arranged on opposite sides of the guiding elements 16, wherein one of the first planar guiding surfaces 17 has a first surface normal N1 directed in a clockwise circumferential direction and the other one of the first planar guiding surfaces 17 has a second surface normal N2 directed in an anti-clockwise circumferential direction of the ring-shaped main body 11.

Accordingly, as exemplarily shown in FIG. 3, opposite surfaces of the complementary second planar guiding surfaces 18 of the one or more of the respective complementary centering elements 21 can be parallel to each other or inclined with respect to each other such that a relative movement of the two or more centering elements 16 with respect to the respective complementary centering elements 21 during thermal expansion of the ring shaped body 11 of the centering device can be realized.

According to an alternative example, which can be combined with other embodiments described herein, one or more of the two or more centering elements 16 may have a round shape (not explicitly shown). In particular, one or more of the two or more centering elements 16 may have a cylindrical shape (e.g. having circular base, egg-shaped base, or elliptical base) extending from the side surface 12 of the ring-shaped body 11. Accordingly, it is to be understood that round shaped, particularly cylindrically shaped, centering elements 16 engaging with respective complementary centering elements 21 having planar guiding surfaces 18, provide for two oppositely arranged contact points, particularly contact lines, between the centering elements 16 and the respective complementary centering elements 21. Thus, a relative movement of the two or more centering elements 16 with respect to the respective complementary centering elements 21 during thermal expansion of the ring shaped body may also be realized with round shaped or cylindrically shaped, centering elements 16 of the centering device 10. According to embodiments, which can be combined with other embodiments described herein, the two or more centering elements 16 are notches and/or cams. Correspondingly, the respective two or more complementary centering elements 21 are cams and/or notches. In other words, the two or more centering elements 16 can include one or more notches and one or more cams, two or more notches, or two or more cams. The respective complementary centering elements 21 may be configured correspondingly. In other words, the respective complementary centering elements 21 may include one or more cams and one or more notches, two or more cams, or two or more notches. FIG. 2 shows an example in which the two or more centering elements 16 are three notches. FIG. 3 shows an example in which the respective complementary centering elements 21 are three cams.

According to embodiments, which can be combined with other embodiments described herein, the centering device 10 is connected to or is a part of a nozzle ring. In particular, the centering device 10 can be connected via at least one of a welded connection, a soldered connection, and one or more fasteners to the nozzle ring. Alternatively, the centering device 10 is an integral part of a nozzle ring. For instance, the centering device and the nozzle ring may be made of a single casted or machined element.

As exemplarily shown in FIG. 2, guide vanes 15 may be provided circumferentially around the central opening 14 on a turbine side 13 of the ring-shaped body 11.

According to an example, which can be combined with other embodiments described herein, the two or more centering elements 16 include at least one cam having a reception 19 for receiving a fixation element 51, particularly a lug, of a heat sheet 50. Accordingly, beneficially the two or more centering elements 16 may be configured to provide a dual function, i.e. a centering on the one hand and fixation of a heat sheet on the other hand.

According to embodiments, which can be combined with other embodiments described herein, the two or more guiding elements 16 are equally spaced apart in a circumferential direction around a central opening 14, as exemplarily shown in FIG. 2. Alternatively, the two or more guiding elements 16 can be irregularly spaced apart in a circumferential direction around the central opening 14 (not explicitly shown).

With exemplary reference to FIG. 4, according to another aspect of the present invention, a turbo system is described. The turbo system includes a bearing housing 20, a turbine housing 40 of a radial turbine, a shaft 34 extending along a central axis 33. The shaft is mounted in the bearing housing 20 and turbine wheel 30 is arranged on or mounted to the shaft. Typically, the shaft 34 extends through the central opening 14 of the centering device 10 as described herein. The turbo system includes an exhaust gas inlet passage 41 formed in the turbine housing 40 upstream of the turbine wheel 30. Additionally, the turbo system includes a centering device 10 according to any of the embodiments described herein. The bearing housing 20 includes centering elements 21 complementary with the two or more centering elements 16 of the centering device 10. The two or more centering elements 16 engage with the respective complementary centering elements 21 provided on the bearing housing 20.

According to embodiments of the turbo system, which can be combined with other embodiments described herein, the centering device 10 is connected to a nozzle ring, particularly via at least one of a welded connection, a soldered connection, and one or more fasteners. Alternatively, the centering device 10 is an integral part of the nozzle ring. The nozzle ring may include vanes 15, as exemplarily shown in FIGS. 2 and 4. For example, the guide vanes 15 can be provided between a first ring-shaped sheet element 111 provided at the bearing housing side 12 a second ring-shaped sheet element 112 provided at the turbine housing side 13. Further, the second ring-shaped sheet element 112 can be connected to a sealing ring 113.

Alternatively, the nozzle ring may be vaneless (not explicitly shown).

According to embodiments, which can be combined with other embodiments described herein, the centering device 10 is made of a material having a higher thermal expansion coefficient than the material of the turbine housing 40 and/or the material of the bearing housing 20.

According to embodiments, which can be combined with other embodiments described herein, the centering device 10 is made of a material having the same thermal expansion coefficient as the material of the nozzle ring.

According to embodiments of the turbo system, which can be combined with other embodiments described herein, the centering device 10 is arranged between the bearing housing 20 and the turbine housing 40. The centering device 10 is arranged and configured such that during operation of the turbo system heat from exhaust gas is transmitted to the centering device 10 and the heat flow rate from the exhaust gas to the centering device is a continuous function. The heat flow rate is $\Delta Q/\Delta t = \kappa \cdot A \cdot \Delta T/\Delta x$, wherein $\Delta Q$ is the net heat (energy) transfer, $\Delta t$ is the time taken, $\Delta T$ the difference in temperature between the cold and hot sides, $\Delta x$ is the thickness of the material conducting heat (distance between hot and cold sides), $\kappa$ is the thermal conductivity, and A is the surface area of the surface emitting heat. Accordingly, the heat flow rate is a continuous function as long as the thermal conductivity $\kappa$ is on the path of the heat flow is continuous or constant.

In other words, according to embodiments which can be combined with other embodiments described herein, the centering device is configured and arranged in a turbo system as described herein such that there is no abrupt change in thermal conductivity along the heat flow path from the exhaust gas to the centering device. For example, as shown in the prior art according to FIG. 1, the void 65 between the nozzle ring 61 and the heat shield represents a thermal conductivity change along the heat flow path at the interfaces from "solid to gaseous" and "gaseous to solid", and thus provides a discontinuous function of the heat flow.

According to embodiments of the turbo system, which can be combined with other embodiments described herein, the turbo system further includes a heat sheet 50 having a fixation element 51, as exemplarily shown in FIG. 4. In particular, typically the fixation element 51, for example a lug, is arranged in a reception 19 of the cams of the centering device 10.

According to another aspect of the present invention, a method of centering a turbine housing 40 with respect to a central axis 33 of a radial turbine of a turbo system is described. The method includes transmitting heat from exhaust gas to a centering device 10 according to any embodiments described herein. Additionally, the method includes centering the turbine housing via thermal expansion of the centering device 10. More specifically, typically transmitting heat from exhaust gas to the centering device includes providing a heat flow rate from the exhaust gas to the centering device, wherein the heat flow rate is a continuous function.

In view of the above, it is to be understood that embodiments as described herein beneficially provide for optimized heat centering of a turbine housing and ensure an optimal turbine efficiency by realizing minimal clearances between turbine, particularly turbine wheel blades, and housing while transient and stationary operation.

While the foregoing is directed to embodiments, other and further embodiments may be devised without departing from the basic scope, and the scope is determined by the claims that follow.

REFERENCE NUMBERS 10 centering device
11 ring-shaped main body
12 side surface
13 turbine side
14 central opening
15 guide vanes
16 guiding elements
17 first guiding surfaces
18 second guiding surfaces
19 receptions
20 bearing housing
21 complementary guiding elements
30 turbine wheel
31 turbine blades
33 central axis
34 shaft
35 radial turbine
36 nozzle ring
40 turbine housing
41 exhaust gas inlet passage
50 heat sheet
51 lug
61 prior art nozzle ring
62 prior art heat shield
63 cold centering element
64 hot centering elements
100 turbo system
111 first ring-shaped sheet element
112 second ring-shaped sheet element
113 a sealing ring
$D_1$ outer diameter
$D_2$ inner diameter
C center

The invention claimed is:

1. A centering device of a nozzle ring for centering a turbine housing with respect to a central axis of a radial turbine of a turbo system, comprising:
    a ring-shaped body having an outer diameter D1 and an inner diameter D2, wherein a ratio of D1/D2 is $\leq 2$; and
    two or more centering elements provided on a side surface of the ring-shaped body for engaging with respective complementary centering elements provided on a bearing housing, wherein the two or more centering elements are configured for allowing a radial thermal expansion of the ring-shaped body during engagement of the two or more centering elements with the respective complementary centering elements, wherein the two or more centering elements have first planar lateral guiding surfaces and the respective complementary centering elements have complementary second planar lateral guiding surfaces for guiding a relative movement of the two or more centering elements with respect to the respective complementary centering elements during thermal radial expansion of the ring-shaped body, wherein the two or more centering elements are at least one of cams and notches, and wherein the respective complementary centering elements are at least one of notches and cams.

2. The centering device of claim 1, wherein opposite surfaces of the first planar lateral guiding surfaces of one or more of the two or more centering elements are parallel or inclined with respect to each other, and wherein opposite surfaces of the complementary second planar lateral guiding surfaces of one or more of the respective complementary centering elements are parallel to each other or inclined with respect to each other.

3. The centering device of claim 1, wherein the centering device is an integral part of the nozzle ring.

4. The centering device of claim 1, wherein the two or more centering elements are equally spaced apart in a circumferential direction around a central opening, or wherein the two or more centering elements are irregularly spaced apart in a circumferential direction around the central opening.

5. The centering device of claim 1, wherein the centering device is connected to the nozzle ring via at least one of a welded connection, a soldered connection, and one or more fasteners.

6. The centering device of claim 1, wherein the centering device is connected to the nozzle ring via at least one of a welded connection, a soldered connection, and one or more fasteners.

7. The centering device of claim 1, wherein the fixation element is a lug.

8. A turbo system, comprising:
a bearing housing;
a turbine housing of a radial turbine;
a shaft extending along a central axis, mounted in the bearing housing and on which a turbine wheel is arranged,
an exhaust gas inlet passage formed in the turbine housing upstream of the turbine wheel, and
a centering device of a nozzle ring for centering a turbine housing with respect to a central axis of a radial turbine of a turbo system, the centering device comprising:
a ring-shaped body having an outer diameter D1 and an inner diameter D2, wherein a ratio of D1/D2 is ≤2; and
two or more centering elements provided on a side surface of the ring-shaped body for engaging with respective complementary centering elements provided on a bearing housing, wherein the two or more centering elements are configured for allowing a radial thermal expansion of the ring-shaped body during engagement of the two or more centering elements with the respective complementary centering elements,
wherein the bearing housing comprises centering elements complementary with the two or more centering elements of the centering device, and wherein the two or more centering elements engage with the respective complementary centering elements, wherein the two or more centering elements have first planar lateral guiding surfaces and the respective complementary centering elements have complementary second planar lateral guiding surfaces for guiding a relative movement of the two or more centering elements with respect to the respective complementary centering elements during thermal expansion of the ring-shaped body, wherein the two or more centering elements are at least one of cams and notches, and wherein the respective complementary centering elements are at least one of notches and cams.

9. The turbo system of claim 8, wherein the centering device is an integral part of the nozzle ring.

10. The turbo system of claim 9, wherein the nozzle ring is made of a material having the same thermal expansion coefficient as the material of the centering device.

11. The turbo system of claim 9, wherein the centering device is connected to the nozzle ring via at least one of a welded connection, a soldered connection, and one or more fasteners.

12. The turbo system of claim 9, wherein the centering device is an integral part of the nozzle ring.

13. The turbo system of claim 8, wherein the centering device is arranged between the bearing housing and the turbine housing, and wherein the centering device is arranged and configured such that during operation of the turbo system heat from exhaust gas is transmitted to the centering device and the heat flow rate from the exhaust gas to the centering device is a continuous function.

14. A method of centering a turbine housing with respect to a central axis of a radial turbine of a turbo system, comprising
transmitting heat from exhaust gas to a centering device of a nozzle ring for centering a turbine housing with respect to the central axis of a radial turbine of a turbo system, the centering device comprising:
a ring-shaped body having an outer diameter D1 and an inner diameter D2, wherein a ratio of D1/D2 is ≤2; and
two or more centering elements provided on a side surface of the ring-shaped body for engaging with respective complementary centering elements provided on a bearing housing, wherein the two or more centering elements are configured for allowing a radial thermal expansion of the ring-shaped body during engagement of the two or more centering elements with the respective complementary centering elements, wherein the two or more centering elements have first planar lateral guiding surfaces and the respective complementary centering elements have complementary second planar lateral guiding surfaces for guiding a relative movement of the two or more centering elements with respect to the respective complementary centering elements during thermal expansion of the ring-shaped body, wherein the two or more centering elements are at least one of cams and notches, and wherein the respective complementary centering elements are at least one of notches and cams; and
centering the turbine housing via thermal expansion of the centering device.

15. The method of claim 14, wherein transmitting heat from exhaust gas to the centering device includes providing a heat flow rate from the exhaust gas to the centering device, wherein the heat flow rate is a continuous function.

* * * * *